US008201463B1

(12) United States Patent
Suhy et al.

(10) Patent No.: US 8,201,463 B1
(45) Date of Patent: Jun. 19, 2012

(54) LIFT TRUCK CLAMP TEST SYSTEM

(75) Inventors: Andrew Suhy, Toledo, OH (US); Chad Truckor, Swanton, OH (US)

(73) Assignee: Total Fleet Solutions, Holland, OH (US)

( * ) Notice: Subject to any disclaimer, the term of this patent is extended or adjusted under 35 U.S.C. 154(b) by 219 days.

(21) Appl. No.: 12/817,635

(22) Filed: Jun. 17, 2010

(51) Int. Cl.
*G01D 7/00* (2006.01)

(52) U.S. Cl. .................................... 73/862.041; 73/856

(58) Field of Classification Search .................... 73/862.041–862.046, 856–860
See application file for complete search history.

(56) References Cited

U.S. PATENT DOCUMENTS

| | | | | |
|---|---|---|---|---|
| 4,090,628 | A | 5/1978 | Sinclair | |
| 4,252,496 | A * | 2/1981 | Williams | 414/623 |
| 4,299,131 | A * | 11/1981 | Seitz et al. | 73/789 |
| 4,685,876 | A * | 8/1987 | Loscei | 425/170 |
| 4,719,804 | A * | 1/1988 | Maruyama | 73/794 |
| 5,292,219 | A | 3/1994 | Merin et al. | |
| 5,911,166 | A * | 6/1999 | Cowan | 73/833 |
| 6,027,302 | A | 2/2000 | Nilsson | |
| 6,142,022 | A * | 11/2000 | Ruegg et al. | 73/821 |
| 7,018,159 | B2 | 3/2006 | Jordan et al. | |
| 7,121,457 | B2 | 10/2006 | Michal, III | |

* cited by examiner

*Primary Examiner* — Max Noori

(74) *Attorney, Agent, or Firm* — MacMillan, Sobanski & Todd, LLC

(57) ABSTRACT

A fixture for measuring clamping forces applied by lift truck clamps has a frame and two or more load measuring assemblies which are adjustably mounted for optimal positioning between the clamps. Actual force measurements are compared to acceptable values and composite feedback is provided using at least two measurements and two comparisons. The system is particularly useful for measuring force balance for clamps having pivotable platens.

20 Claims, 5 Drawing Sheets

85 84 83 82 81

| Site Data WtUB | WtUF | WtLB | WtLf | TotalWt | TD | Pressure | TruckID |
|---|---|---|---|---|---|---|---|
| 134 | 204 | 356 | 500 | 1194 | 5/7/2010 8:46 | L | E301A301 |
| 398 | 456 | 533 | 741 | 2128 | 5/7/2010 8:45 | H | E301A301 |
| 402 | 454 | 530 | 744 | 2130 | 5/7/2010 8:45 | H | E301A301 |
| 137 | 200 | 353 | 498 | 1188 | 5/7/2010 8:47 | L | E301A301 |
| 640 | 361 | 544 | 599 | 2144 | 5/7/2010 8:53 | H | E301A304 |
| 633 | 361 | 543 | 600 | 2137 | 5/7/2010 8:54 | H | E301A304 |
| 193 | 201 | 350 | 398 | 1142 | 5/7/2010 8:54 | L | E301A304 |
| 192 | 198 | 353 | 404 | 1147 | 5/7/2010 8:55 | L | E301A304 |
| 394 | 352 | 481 | 743 | 1970 | 5/7/2010 9:02 | H | E301A312 |
| 369 | 352 | 478 | 741 | 1967 | 5/7/2010 9:03 | H | E301A312 |

80

FIG. 3

90

91

Toledo A-1

Records = 4

| WtUB | %UB | WtLF | %UF (94) | WtLB (93) | %LB (94) | WtLF (93) | %LF | Total Wt (93) |
|---|---|---|---|---|---|---|---|---|
| 302 | 15 | 429 | 21 | 567 | 28 | 716 | 36 | 2014 |
| 358 | 17 | 499 | 24 | 580 | 27 | 684 | 32 | 2121 |
| 125 | 12 | 235 | 22 | 328 | 31 | 378 | 35 | 1066 |
| 129 | 12 | 242 | 22 | 335 | 31 | 377 | 35 | 1083 |

| Date | Pressure | clamp ID | Type (92) | total Wt Score (96) | adjust (97) | Compliance_ Score |
|---|---|---|---|---|---|---|
| 1/13/2010 2:05 | H | 325 | A | 25 | 0 | 25 |
| 1/13/2010 2:05 | H | 325 | A | 25 | 0 | 25 |
| 1/13/2010 2:06 | L | 325 | A | 0 | 0 | 10 |
| 1/13/2010 2:07 | L | 325 | A | 0 | 0 | 10 |

FIG. 4

100

Average Monthly Aggregate Scores Per Warehouse Site

Aggregate Scores = Total Force Scores + Force Distribution Scores
Lower is Better with an Ideal Score = 0
Total Forced Score = 25 pts for each High Medium and Low Force Test
Force Distribution Score = 5 pts outside +/- 5% of target
Force Distribution Score = 10 pts outside +/- 10% of target
Max Possible score per test result = 65 pts which equates to a total force of spec + extremely poor force distribution for all 4 loadcells

101

| SITE NAME | JAN | FEB | MAR | APR | MAY | JUNE |
|---|---|---|---|---|---|---|
| deadwsood | 14 | 17 | 6 | 6 | 7 | 6 |
| cleveland | 14 | | 7 | 6 | 7 | 8 |
| clyde | | 15 | 16 | 17 | 13 | 12 |
| findlay | 29 | 26 | 7 | 6 | 6 | 6 |

FIG. 5

LIFT TRUCK CLAMP TEST SYSTEM

FIELD OF THE INVENTION

This invention generally relates to lift trucks with clamps and more particularly to clamping force testing of such lift trucks.

BACKGROUND OF THE INVENTION

Lift trucks are widely used to transport goods in warehouses, factories, etc. One common type of lift truck has forks especially adapted for insertion under a pallet for lifting the pallet and its contents. Another common type of lift truck has opposing clamps for grasping and lifting items, such as boxes, by the sides. The problem with clamp type lift trucks is that the clamping force is critical; too little force will allow the item to slip from the grasp of the clamps, while too much force may damage the item.

Lift truck clamps can be large for certain uses. For example, clamps for moving refrigerators or other large appliances may be three feet by four feet. The clamping force problems are exacerbated by larger sized clamps because clamp balancing becomes a potential problem in addition to total clamp force. A clamp balancing issue may exist when area of a clamp, such as the top area or the forward area, is applying more of a force to the grasped item that another areas.

To alleviate some of the force balance problems with large clamps, it is common to utilize pivotable platens. Such pivotable platens alleviate but do not resolve all of the force balancing problems. Various tests have been devised to measure total clamping force. Single point testing has been done using hydraulic pressure gage. This measures total clamping force but not force distribution. No adequate test is known to adequately measure and analyze both total force and force balance.

SUMMARY OF THE INVENTION

The present invention is a test fixture and method of testing clamping forces of a lift truck. The test fixture includes load cells which may be positioned at optimum locations on the fork lift clamps to measure "force balance." The method includes simultaneously measuring clamping force at more than one location on each clamp, comparing the measured clamping forces to predetermined desirable values, and providing feedback of the results.

Various aspects of this invention will become apparent to those skilled in the art from the following detailed description of a preferred embodiment.

BRIEF DESCRIPTION OF THE DRAWINGS

FIGS. 3, 4 and 5 are examples reports produced in conjunction with the present invention.

DETAILED DESCRIPTION OF A PREFERRED EMBODIMENT

Figure 1:
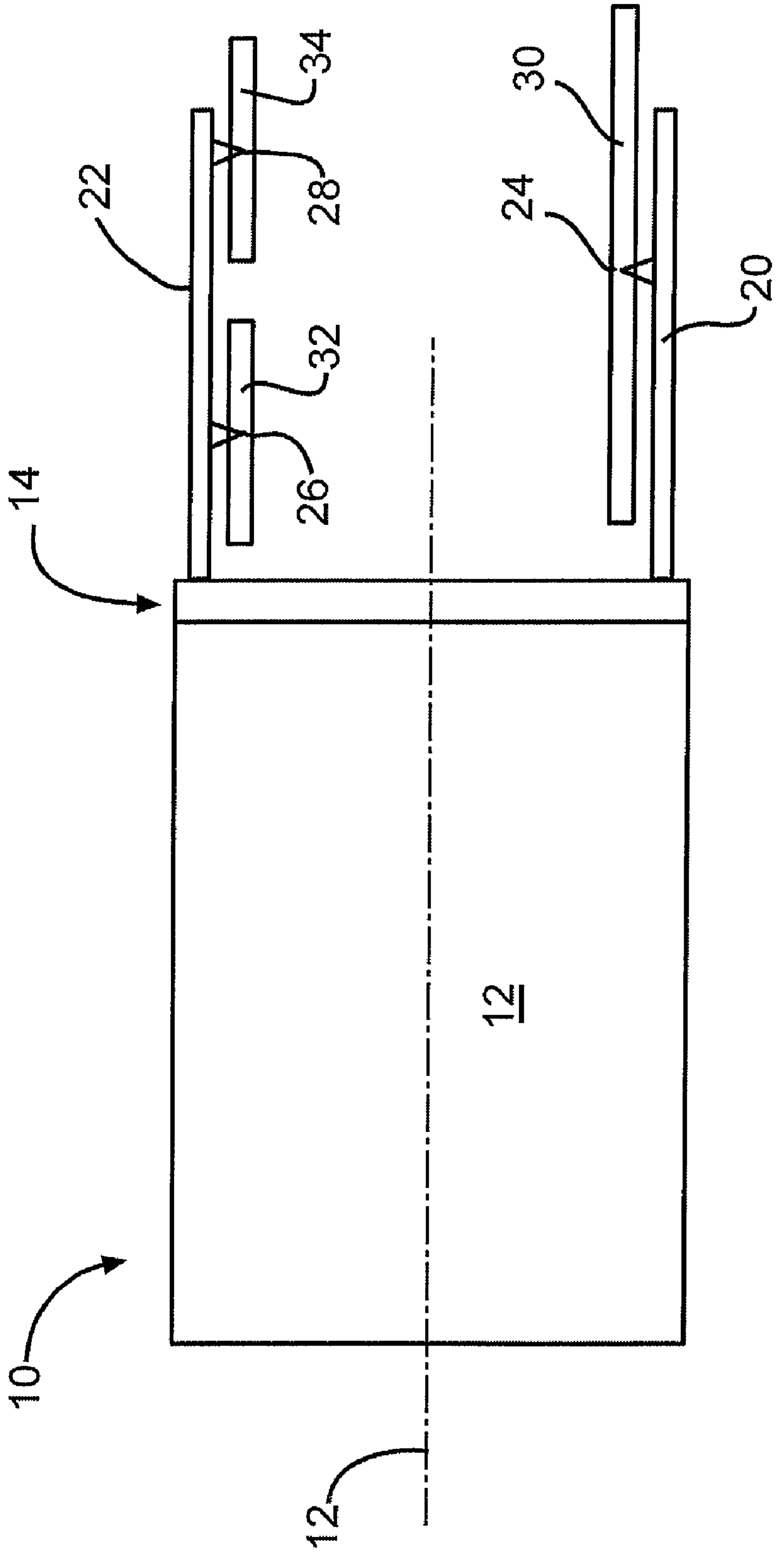
FIG. 1 is a schematic view of a clamping type lift truck.

Referring to FIG. 1, a clamp type lift truck 10 moveable along a forward and rearward directional axis 16 has a driver compartment 12 and a lift assembly 14. The lift assembly 14 includes opposing clamps 20, 22 with pivotal platens. Clamp 20 includes a single pivotal platen 30. Common platen dimensions for large appliances are 34 inches deep by 54 inches high. Clamp 22 includes two pivotal platens 32, 34. Platen 30 is pivotally connected to clamp 20 by a hinge 24, and platens 32 and 34 are pivotally connected to clamp 20 by hinges 26, 28, respectively, as is well known in the art. Platens pivot only around a horizontal axis. Various combinations of pivotal platens are utilized for various lifting applications.

Figure 2:
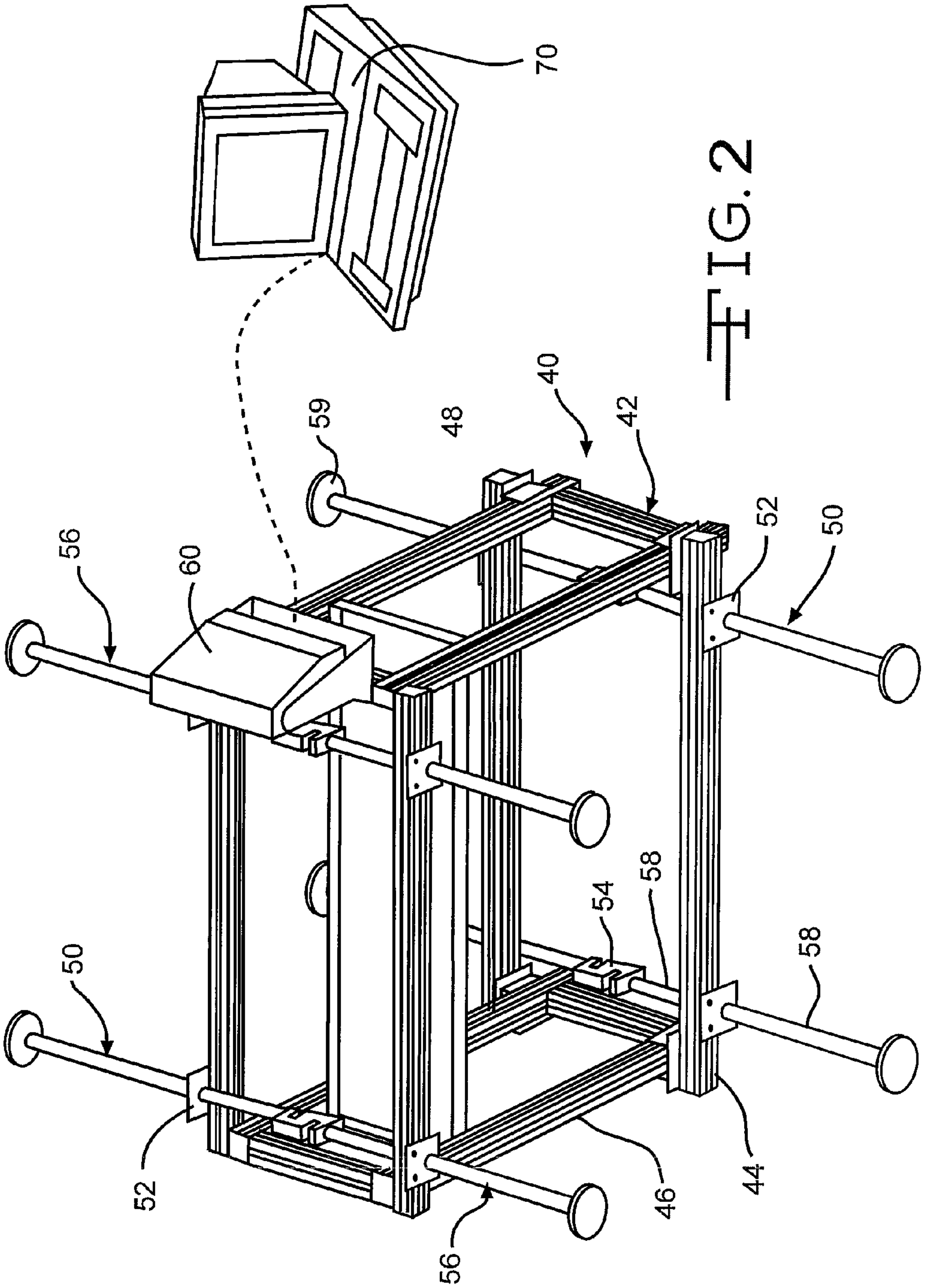
FIG. 2 is a perspective view of a test fixture of the present invention.

A clamp force test fixture 40 is shown in FIG. 2. The fixture has an aluminum frame 42 formed with 8020 aluminum channels. Four horizontal channels 44 are connected to four vertical channels 46 by eight brackets 48. The brackets 48 allow adjusting of the relative vertical positions of horizontal channels 44 relative to vertical channels 46.

Four load assemblies 50 are mounted on the horizontal frame channels 44 by eight brackets 52. The brackets 52 are movable along the horizontal channels to adjust the horizontal position of each load assembly 50. It will be understood that each of the four load assemblies is movable independent of the others in both the horizontal and vertical directions.

Each load assembly 50 includes a centrally located load cell 54 and opposed shaft assemblies 56 threaded into either side of each load cell. The load cells in the preferred embodiment are universal S-type 5000 pound axial load cells, such as Vishay 363 S-Beam load cells. The 5000 pound rating is generally higher than the expected static load from the clamping force to accommodate any inadvertent dynamic impact loading without damage.

Each shaft assembly is constructed of three longitudinally extending and solid steel rods 58. In one preferred embodiment, the shaft assemblies include two four inch long rods and one 12 inch long rod. The rods of the multi-piece rod assemblies are threaded and interchangeably connected to permit adjusting of the load assembly length to accommodate different clamp spacings, as will be appreciated by those skilled in the art. Most items handled by lift truck clamps are between 42 and 50 inches wide. A pivotable swivel 59 is threaded onto the outer ends of each load assembly for facilitating engagement with the lift truck clamp.

A programmable logic controller 60 is mounted on the frame and wired to each load cell 54 with 18 gage wire. The controller 60 records and stores test data received from the load cells 54. In a preferred embodiment, a Rice Lake 920I controller is used. This controller date stamps each test and has an active data base wherein new data entrees cause automatic updating of affected reports.

After tests are run, the controller 60 uses as standard text/file download to transmit data to an analysis computer 70 for analysis and reporting. The data analysis software organizes and manipulates the data into report formats as will be described.

The first steps of a preferred test procedure are to position the test fixture 40 properly relative to a lift truck and to select a nominal clamping force. A fork lift 12 with open clamps 20, 22 is moved to a position in which the clamps encompass the test fixture. Preferably, the lift assembly 14 abuts the fixture frame opposite the logic controller 60. Each load assembly 50 is then properly positioned so that "force balance" may be measured. The horizontal position of each load assembly 50 is fine tuned by sliding the brackets 52 along the horizontal frame channels 44. The vertical position of each load assembly 50 is fine tuned by sliding the horizontal frame channels 44 up or down along vertical frame channels 46 using brackets 48.

It generally is preferred that the pivot 24 of a clamp having a single pivotal platen such as 30 be centered between all of the load assembly contact points, but other configurations may be used for particular tests. With clamps having multiple pivotal platens such as 32, 34, it is generally preferred that the pivot points are equally spaced from the load assembly contact points to provide a balanced force reaction if the clamp forces are balanced, but other positions may be used for particular tests. For example, for some items to be lifted, it may be desirable for clamping force to be applied 60% at the forward most load assembly contact points and 40% at the rearward most contact points. In the test fixture 40 with four load assemblies 50, each forward most load assembly would receive 30% of the total load which each rearward most assembly would receive 20%.

Because the desired clamping force may vary according to the job, it is desirable to test clamping force at more than one nominal setting, for example, 1000 and 2000 pounds, to assure that the nominal truck settings are properly calibrated. Successive tests are generally done without adjusting the load assembly contact positions, but there may be occasions where they are adjusted for successive tests.

FIG. 3 shows a sample raw data report 80 from controller 60 after a series of tests. Each line of the report represents a test and includes columns for truck identification 81, nominal force setting 82 (high, medium and low in this example), test date and time 83, actual measured total force applied by the clamps 84, and actual measured force at each load assembly 85. In this example, four load assemblies 50 were used and designated Upper Back (UB), Upper Front (UF), Lower Back (UB), and Lower Front (LF).

FIG. 4 is an example of an analysis report 90 made by the analysis computer 70 after test data is downloaded from the controller 60. The analysis report includes lift truck identification 91, clamp type 92 (with articulated platens in this example), and columns showing raw data 93 similar to that of the raw data report 80. In addition to the actual forces measured at each load assembly, columns 94 show the forces as a percentage of total measured force.

Report 90 is color coded. A green cell indicates that the actual measured total force or load assembly force is within a desired range; yellow indicates that the measured force is outside of the desired range, but within a larger range deemed to be marginally acceptable; red indicates that the measured force is outside of both ranges.

In addition, report 90 provides feedback in the form of a compliance score 95. The compliance score is the aggregate of a total weight score 96 and the force distribution score 97. In this report, a compliance score of zero is desirable, meaning that both total force and the forces measured at each load assembly are at least marginally within compliance, i.e. within the second marginally desirable range. The compliance score can be used to set priorities for taking corrective action, such as adjusting the lift truck clamps, adjusting the nominal clamping force settings of the lift truck, or making other repairs. The compliance score can also be used and as a source of lift truck replacement advice.

The consolidated report 90 provides all information necessary to prioritize and correct problems. The color coding allows problem areas to be seen readily. For example, the report facilitates determining the root cause of problems, such as total force or imbalance. Using statistical methods, trend analysis can be done, predictions can be made, and corrective actions can be prioritized.

A high level analysis can be done for a group of trucks, for example, at a facility. FIG. 5 shows a monthly aggregate report 100 for a group of lift trucks, such as from a certain facility. The report 100 provides an average monthly aggregate score for a group or a facility. The report includes a legend 101 which explains the scorecard. Report 100 is color coded similar to report 90 for quick recognition of issues which need attention.

The present invention is highly suited for maintaining proper calibration of lift trucks which are continually used and subjected to distortion causing forces. However, this invention is also well suited to be used by original lift truck manufacturers to assure proper clamp force factory settings for new trucks.

The preferred embodiment described herein is merely illustrative of the principles of the invention. Numerous modifications may be made without departing from the spirit and scope of the invention as defined by the appended claims.

What is claimed is:

1. A force balanced clamp load test fixture for a lift truck, the lift truck having a directional axis and opposing clamps movable in a direction transverse to the lift truck axis, and a platen pivotally mounted on at least one clamp, the test fixture comprising:

a frame adapted to be positioned between the opposing clamps of the lift truck, first and second longitudinally extending load assemblies mounted on the frame and oriented generally parallel to each other and generally transverse to the lift truck axis, the load assemblies each selectively positionable on the frame between the opposing clamps, wherein the load assemblies may be positioned such that the pivot point of the platen is positioned at an optimum location relative to the load assemblies, each load assembly including a load cell adapted to measure clamping force applied by the opposing clamps.

2. A clamp load test fixture as defined in claim 1 further comprising third and fourth longitudinally extending load assemblies oriented generally parallel to the first and second load assemblies, the third and fourth load assemblies each selectively positionable on the frame between the opposing clamps, wherein the load assemblies may be positioned such that the pivot point of the platen is positioned at an optimum location relative to the load assemblies.

3. A clamp load test fixture as defined in claim 2 wherein the load assemblies are individually positionable along a horizontal axis of the frame.

4. A clamp load test fixture as defined in claim 3 wherein the load assemblies are selectively positionable along a vertical axis of the frame.

5. A clamp load test fixture as defined in claim 4 wherein the length of the load assemblies is adjustable.

6. A clamp load test fixture as defined in claim 5 wherein the first and second load assemblies comprise a plurality of rods.

7. A clamp load test fixture as defined in claim 6 wherein the first and second load assemblies comprise leveling pads mounted on the ends of each assembly, whereby the leveling pads engage the clamp platen upon opposing movement of the clamps.

8. A clamp load test fixture as defined in claim 3 further comprising a data recorder in communication with each load cell to record clamping forces measured by each load assembly.

9. A clamp load test fixture as defined in claim 7 wherein the data recorder is wired to each load cell.

10. A method of measuring clamp force for a lift truck having opposing clamps, the method comprising:

a. positioning the opposing clamps adjacent a test fixture, b. selecting a first nominal clamping force value to be applied by the opposing clamps, c. applying the first nominal clamping force to the test fixture, d. simultaneously measuring the actual clamping force exerted by the opposing clamps at a first and a second location on each clamp, e. comparing the measured clamping force at the first location to a predetermined desirable value for the first location at the first nominal clamping force value, f. comparing the measured clamping force at the second location to a predetermined desirable value for the second location at the first nominal clamping force value, and g. providing feedback of the results of the comparisons.

11. A method as defined in claim 10 wherein the feedback includes a composite score reflecting the total clamp force, deviation of the actual clamping force at the first location from the desirable value at the first location at the nominal force value, and deviation of the actual clamping force at the second location from the desirable value at the second location at the nominal force value.

12. A method as defined in claim 10 wherein at least one of the clamps includes a pivotable platen, and wherein the first and second locations are within the boundary of the platen.

13. A method as defined in claim 10 wherein the feedback includes a total clamping force.

14. A method as defined in claim 10 wherein the desirable value for the first location comprises a first range.

15. A method as defined in claim 14 wherein the desirable value for the first location comprises a second range broader than the first range.

16. A method as defined in claim 15 wherein the feedback indicates whether the measured clamping force at the first location at the first nominal clamping force is (a) within the first range, (b) outside of the first range but within the second range, or (c) outside of the second range.

17. A method as defined in claim 14 wherein the feedback further comprises visual graphical indicators representing the value of the actual clamping force at the first location relative to the first and second ranges.

18. A method as defined in claim 16 wherein the feedback further comprises data collected during a plurality of tests.

19. A method as defined in claim 16 wherein the feedback further comprises an indicator for setting priorities for taking corrective action on the lift truck.

20. A method as defined in claim 16 wherein the feedback further comprises an indicator for suggesting lift truck replacement.

* * * * *